Aug. 21, 1962     JENG C. SHANG     3,050,210
ELEVATED TANK
Filed Sept. 13, 1961

INVENTOR.
JENG C. SHANG
BY
*Byron, Humes, Groen, & Clement*
ATTYS.

United States Patent Office 3,050,210
Patented Aug. 21, 1962

3,050,210
ELEVATED TANK
Jeng C. Shang, East Chicago, Ind., assignor to Union Tank Car Company, Chicago, Ill., a corporation of New Jersey
Filed Sept. 13, 1961, Ser. No. 137,851
13 Claims. (Cl. 220—18)

The present invention relates to elevated tanks and, in particular, to elevated tanks of relatively large capacity embodying only a single-element riser.

More specifically, the present invention is specifically an improvement over the elevated tank illustrated and claimed in the Sturm Patent No. 2,855,121, assigned to the same assignee as the present application.

It is an object of the present invention to provide a new and improved elevated tank of the type embodying a single supporting riser.

It is another object of the present invention to provide a new and improved tank embodying a generally toroidal storage vessel supported by a single riser construction.

It is yet another object of the present invention to provide a new and improved elevated tank having a construction requiring a minimum of internal bracing.

It is a further object of the present invention to provide in an elevated tank a new and improved storage vessel.

It is yet a further object of the present invention to provide in an elevated tank a generally toroidal storage vessel having a cross-section that provides at vertically aligned points at least one positive vertical component of the membrane forces of the vessel.

It is still a further object of the present invention to provide in an elevated tank a generally toroidal storage vessel having a cross-section such that the points of horizontal tangency are horizontally and vertically displaced.

The above and other objects are realized in accordance with the present invention by providing a new and improved elevated tank that stores liquid in a vessel at a point spaced above ground level. Briefly, the elevated tank comprises a generally toroidal storage vessel supported solely by a single riser. The storage vessel has a cross-section which provides at least one positive vertical component of the membrane forces of the vessel at vertically aligned points on the cross-section. By this construction the two points of horizontal tangency on the cross-section of the vessel, at which the vertical components of the membrane forces of the vessel are zero, are not vertically aligned but are horizontally displaced. Hence, at every pair of vertically aligned points on the cross-section, there is provided at least one positive vertical component of the membrane forces of the vessel.

The invention, both as to its organization and method of operation, taken with further objects and advantages thereof, will best be understood by reference to the following description taken in connection with the accompanying drawing in which.

Figure 1:
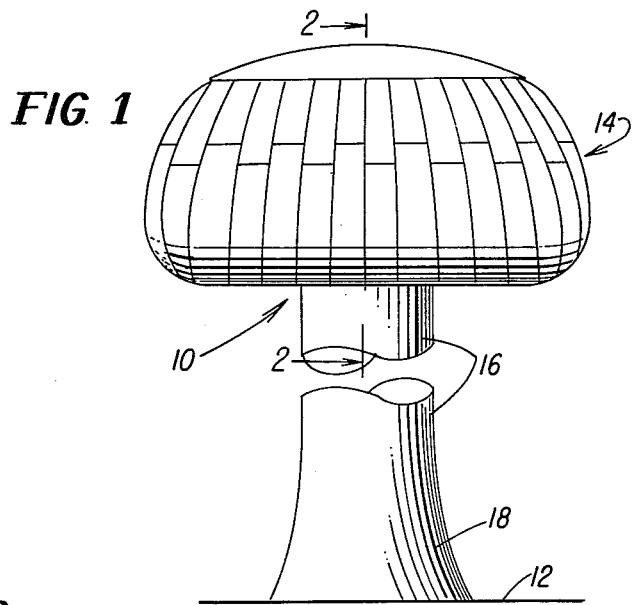
FIG. 1 is a fragmentary side elevational view of an elevated tank embodying the features of the present invention.

Referring now to the drawing and, in particular, to FIG. 1, an elevated tank embodying the features of the present invention is generally identified by reference numeral 10. The elevated tank 10 extends vertically upward from the ground 12 and functions to store liquid, for example water, at a desired point above the ground.

The elevated tank 10 is of the same general type as the elevated tank disclosed in the Sturm Patent No. 2,855,121 and, similar to the tank disclosed in the above patent, is supported on a suitable foundation (not shown) embedded in the ground 12. The tank 10 includes a generally toroidal storage vessel 14 supported solely at a desired location above the ground 12 by a single vertical riser 16. The vertical riser 16 has a flared lower portion 18 for imparting stability to the storage vessel 14 and a generally cylindrical body, the upper end of which is suitably connected to the vessel 14. The riser 16 is constructed from generally cylindrical plates that are suitably welded together and is erected in accordance with any of the methods well known to those skilled in the art.

The storage vessel 14, as suggested above, stores a quantity of water and, depending upon the height of the riser 16, provides the necessary head for conveying the water at a designated pressure to water consuming facilities on the ground 12.

Figure 2:
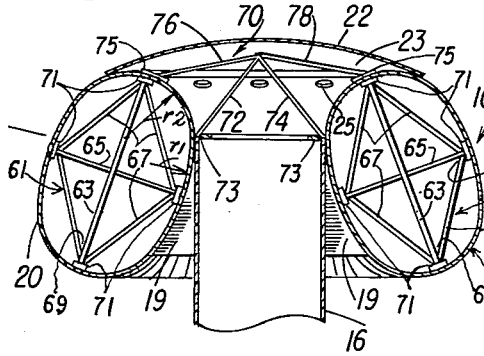
FIG. 2 is a sectional view taken along line 2—2 of FIG. 1, illustrating one embodiment of the present invention.

As best seen in FIGS. 1 and 2, the elevated tank 14 comprises both a generally toroidal structure 20 which coacts with the upper part of the riser 16 to define the bottom and sides of the storage vessel 14 and, further, comprises a generally spherical cap 22 which in combination with the toroidal structure 20 defines the top of the storage vessel 14. The cap 22 is fabricated from a plurality of generally pie-shaped plates that are suitably secured together, the lower sections of which are suitably secured to the upper part of the toroidal structure 20 to define a space 23 that also is capable of storing water. To permit the passage of air between the space 23 and the interior of the toroidal structure 20 during filling and evacuation of the toroidal structure 20, several openings 25 are provided in the upper part of the toroidal structure 20.

Similar to the cap 22, the toroidal structure 20 is fabricated from a plurality of plates having generally truncated pie-shapes shown in FIG. 1. As illustrated, the inner side of the toroidal structure 20 is suitably secured by welding or the like to the upper end 17 of the riser 16. In order to more securely attach the vessel 14 to the riser 16, a series of gussets 19 are vertically disposed and suitably secured between the inside of the toroidal structure 20 and the outside of the riser 16. Although not clearly illustrated, the gussets 19 are horizontally displaced around the riser 16 to offer maximum support to the vessel 14.

As suggested above, the bottom of the storage vessel 14 includes the upper part of the riser 16. To this end, the riser 16 may have the form illustrated in either FIG. 3 or FIG. 4 of the above-identified Sturm patent. Specifically, if a downcomer (see FIG. 3 of the Sturm patent) is employed within the riser 16, an upwardly opening bowl having, for example, a hemi-spherical shape is suitably welded to the inside of the riser 16 adjacent its upper end, thereby providing a liquid tight seal between the bowl and the riser 16. The lower end of the bowl is apertured and is suitably welded to the upper end of the downcomer. The water stored in the lower portion of the toroidal structure 20 communicates with the downcomer by an inclined conduit. Alternatively, if the riser 16 does not embody a downcomer but is used itself to conduct water between ground and the vessel 14, then no structure is employed at the upper part of the riser 16. In this event, the water stored in the lower portion of the toroidal structure 20 communicates with the riser 16 by, for example, a plurality of syphon pipes (see FIG. 4 of the above Sturm patent).

In accordance with a feature of the present invention, the toroidal structure 20 is constructed so that at vertically aligned points on its cross-section there exists at least one positive vertical component of the membrane forces of the vessel, the membrane forces being defined as those forces developed by the wall of the structure 20 that support the weight of the stored water and of the toroidal structure 20. Expressed in another way, the toroidal structure 20 has a cross-section such that its points of horizontal tangency are displaced horizontally, with the result that at vertical aligned points, irrespective of the horizontal location, the vertical components of the tensional forces of the vessel are not zero—as is the case of prior art elevated tanks, typified by the above Sturm patent.

Figure 6:
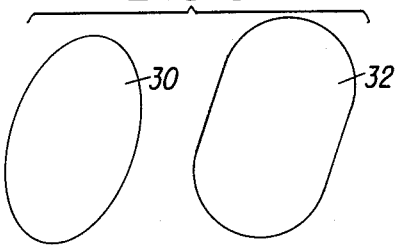
FIG. 6 is a view illustrating typical cross-sectional constructions of other embodiments of the present invention.

Referring now to the specific configuration of the toroidal structure 20 in greater detail, attention is invited to FIG. 2. As illustrated, it has an elongated cross-section which is inclined upwardly and inwardly relative to the axis of the riser 16. In the form of the toroidal structure illustrated, its cross-section has a double oval shape defined by two different radii. Particularly, the middle of the cross-section is defined by a radius $r_1$ while the ends of the cross-section are defined by a radius $r_2$ which, as clearly seen in FIG. 1, is smaller than radius $r_2$. In any event, it should be understood that an elliptical cross-section, illustrated in FIG. 6 and identified by reference numeral 30, may be equally well embodied in the toroidal structure 20. As a matter of fact, other cross-sections, one of which is also illustrated in FIG. 6 and identified by reference numeral 32, may likewise be embodied in the toroidal structure 20. Although generally symmetrical cross-sections are illustrated, it should be appreciated that an unsymmetrical section, for example, an egg-shaped section, could also satisfactorily be used.

The specific form of the cross-section of the toroidal structure 20 in many cases will be determined by the requirements of the job, the construction material available, or the type of fabricating equipment available. However, irrespective of the specific form of cross-section employed, it should be appreciated that in all of the above described forms the upper and lower points of horizontal tangency are displaced horizontally so that the points, at which the membrane forces have no vertical components, are not in vertical alignment.

Figure 4:
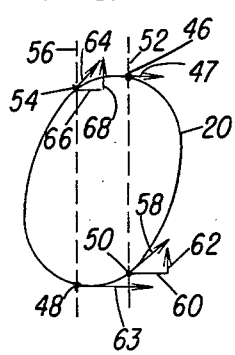
FIG. 4 is a sectional view of a portion of the tank of FIG. 1, illustrating components of the membrane forces of certain portions of the tank.
Figure 5:
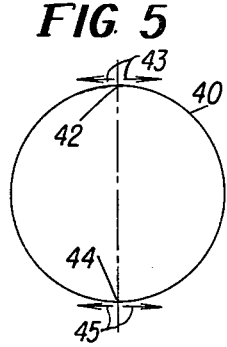
FIG. 5 is a view similar to FIG. 4, illustrating the components of the membrane forces of prior art tanks.

A detailed understanding of the concept embodied in the new and improved elevated tank 10 is facilitated by reference to FIGS. 4 and 5. A prior art form of toroidal storage vessel, typified by the storage vessel disclosed in the above Sturm patent, is illustrated fragmentarily in FIG. 5. The toroidal storage vessel in the Sturm patent (FIG. 5) has, in contrast to the storage vessel 14, a generally circular cross-section 40 such that its points of horizontal tangency 42 and 44 are vertically aligned and lie within a vertical plane designated 46. At each of the points 42 and 44 of horizontal tangency, the membrane forces of the vessel 40 are directed horizontally, as indicated by the vectors 43 and 45, and accordingly the vertical component of the membrane forces at point 42 is zero and the vertical component of the membrane forces at point 44 is likewise zero. Thus, the vessel 40 itself at the points of horizontal tangency 42 and 44 does not perform any vertical supporting function and does not support the weight of either the stored liquid or the vessel itself. Accordingly, it is necessary that a toroidal vessel having a circular cross-section be supported by other means to overcome the above-described disadvantage. As is well known, the supporting elements are conventionally made of steel and are relatively expensive. As a result of the use of the supporting elements, the cost of the storage tank is decreased proportionately.

On the other hand, if the storage vessel 14 has an inclined elongated cross-section, for example, an inclined symmetrical oval shape as illustrated in FIGS. 2 and 4, the upper point of the horizontal tangency 46 is displaced to the right of the lower point of horizontal tangency 48. Similar to the circular cross-section illustrated in FIG. 5, the vertical components of the membrane forces of the toroidal structure 20 at points 46 and 48 are both zero. However, the point 50 vertically aligned beneath the points of horizontal tangency 46 (and disposed in the same vertical plane 52) is not zero but is a positive value. Similarly, the point 54 vertically aligned above the point of horizontal tangency 48 (and disposed on the same vertical plane 56) does not have a zero vertical component but has a positive value. Hence, the condition described in the circular cross-section structure does not exist in the toroidal structure 20.

More specifically, if the membrane forces of that portion of the toroidal structure 20 to the left of the plane 52 are analyzed, it will be seen that the membrane forces at the point of horizontal tangency 46 are directed horizontally (as indicated by vector 47). Hence, the vertical component at point 46 is zero. However, the membrane forces at the point 50 are inclined upwardly, as indicated by the inclined vector 58, and have both a horizontal component 60 and vertical component 62. Hence, even though the vertical component of the membrane forces at the point 46 is zero, the vertical component of the membrane forces at its vertically aligned point 50 is positive, as designated by vector 62. Accordingly, in contrast to the circular cross-section structure, the membrane strength of the toroidal structure 20 acts to support both the weight of the water and the structure 20 itself.

Similarly, if the membrane forces of that part of the toroidal structure 20 to the left of that plane 56 are analyzed, it will be observed that the membrane forces at the point of horizontal tangency 48 are directed horizontally. Hence, the vertical component of the membrane forces at point 48 is zero. However, the membrane forces of the toroidal structure 20 at the point 54 (vertically aligned above the horizontal tangency 48) are inclined upwardly, as indicated by vector 64 and, accordingly, have both a horizontal component 66 and a vertical component 68. Thus, even though the vertical component of the point of horizontal tangency 48 is zero, the vertical component at the vertically aligned point 54 is positive, as indicated at 68. Hence, in contrast to the circular cross-section structure, the membrane strength of the toroidal structure 20, as viewed at points 48 and 54, actively helps support the weight of the liquid and the structure 20 itself.

By virtue of employing an inclined elongated cross-section, the membrane strength of the toroidal structure 20 is more efficiently used to support the weight of the liquid and the toroidal structure 20 itself. As a consequence, the toroidal structure 20 is better able to support these loads and the internal supports normally required in prior art arrangements, typified by the tank disclosed in the above Sturm patent, may be substantially reduced in the present invention.

Referring now to the constructional details of the elevated tank 10, as clearly shown in FIG. 2, it embodies an internal supporting arrangement, a portion of which is disposed within the toroidal structure 20 and a portion of which is disposed between the cap 22 and the toroidal structure 20. More specifically, the portion of the internal supporting arrangement located in the structure 20 comprises spaced apart polygonal bracing frames 61, only one of which is illustrated in FIG. 2. The frames 61 lie in vertical radial planes and each comprises a support member 63 extending along the major axis of the cross-section of the toroidal structure 20 and a support member 65 extending along the minor axis of the cross-section. As illustrated, adjacent ends of the support members 63 and 65 are interconnected by peripheral struts 67 so as to define four corners 69. In order to more evenly distribute the loads transferred between the toroidal structure 20 and the frame 61, the corners 69 are secured to the inner surface of the toroidal structure 20 by attachment lugs 71 having relatively large contact surfaces.

As clearly shown in FIG. 2, a tension framework is disposed within the space 23 defined by the cap 22 and the upper end of the toroidal structure 20. The tension framework, similar to that portion of the internal supporting arrangement located within the toroidal structure 20 comprises spaced apart bracing frames 70, only one of which is illustrated in FIG. 2. The frames 70 lie in vertical radial planes and function to interconnect a tension ring 73 located at the upper end of the riser 16 and a tension ring 75 located near the upper end of the toroidal structure 20. It will be appreciated that the tension rings 73 and 75 act to distribute the load uniformly over the entire circumference of the riser 16 and the entire circumferential upper end of the toroidal structure 20, respectively. Specifically, each bracing frame 70 includes a pair of struts 72 and 74 which extend inwardly and upwardly from the opposite sides of the tension ring 73 to intersect one another at their upper ends. Similarly, a pair of struts 76 and 78 extend upwardly and inwardly from the opposite sides of the tension ring 75 so that their upper ends join one another and join the upper ends of the struts 72 and 74. By this arrangement, the inwardly facing portion of the upper end of the toroidal structure 20 is fixedly secured to the upper end of the riser 16. Hence, the storage vessel 14 is securely attached to the riser 16, even though the lower part of the toroidal structure 20 is substantially spaced from the riser 16.

In a modified form of the elevated tank 10, not illustrated, the tension framework in the space 23 is eliminated and the polygonal bracing frames within the toroidal structure 20 are modified. Specifically, in each polygonal bracing frame 61, an internal ring is disposed along the inner surface of the toroidal structure 20 and is substituted for the attachment lugs 71 so that the corners 69 of the bracing frames are connected to the internal ring to more evenly distribute the stresses in the toroidal structure 20.

Figure 3:
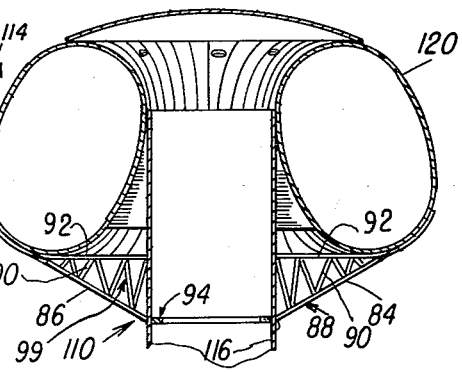
FIG. 3 is a view similar to FIG. 2, illustrating a second embodiment of the present invention.

An alternative embodiment of the elevated tank 110 is illustrated in FIG. 3 and in contrast to the internal supporting arrangement embodied in the elevated tank 10 of FIG. 2, the elevated tank 110 of FIG. 3 embodies an external supporting arrangement. By the use of the external supporting arrangement, the internal bracing frames 61 can be eliminated (as shown) or can be substantially reduced in size. With the exception of the supporting arrangement, the construction of the elevated tanks 10 and 110 is identical. In the interest of avoiding unnecessary duplication of description, the constructional details of elevated tank 110 are not set forth in view of the above detailed description of elevated tank 10.

In contrast to the internal supporting arrangement which interconnects the external upper end of the riser 116 with the upper end of the toroidal structure 120, the supporting arrangement in the FIG. 3 embodiment interconnects points on the riser 116 located below the toroidal structure 120 and the lower end of the toroidal structure 120 itself. The external supporting arrangement includes spaced apart bracing frames 88, each of which lie in vertical radial planes. More specifically, each of the bracing frames 88 comprises a pair of struts 84 and 86 which extend upwardly and outwardly from the riser 116 so as to engage the outer surface of the toroidal structure 120 adjacent its major axis. The struts 86 and 88 extend upwardly along the outer surface of the toroidal structure 120 for a short distance as shown. By this arrangement, the stress concentration between the upper ends of the struts 84 and 86 and the lower end of the toroidal structure 120 is greatly minimized. To the same end, a horizontal compression ring 94 is located internally of the riser 116 where the lower ends of the struts 84 and 86 engage the riser. Hence, the load in the struts 84 and 86 are uniformly distributed and transferred from the toroidal structure 120 to the riser 116. If required, struts 90 and horizontal supports 92 can be provided to form a truss frame 99 that offers an even stronger support for the toroidal structure 120. In any event, similar to the internal supporting arrangement embodied in the storage tank 10 of FIG. 2, additional support for the storage tank 114 is afforded even though the inner portion of the toroidal structure 120 is substantially spaced from the riser 116.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. An elevated tank comprising a single riser construction, a storage vessel for housing liquid located at the upper end of and supported solely by the riser construction, said vessel having a generally toroidal construction of non-circular vertical cross-section having its upper and lower points of horizontal tangency horizontally displaced, and means for connecting the storage vessel to the upper end of said riser.

2. An elevated tank comprising a single riser construction, a storage vessel for housing liquid located at the upper end and supported solely by the riser construction, said vessel having a generally toroidal construction provided with a central opening, said toroidal construction having a non-circular vertical cross-section so that in every vertical plane intersecting the cross-section there exists a positive vertical component of the tensional forces of the vessel, and means for connecting the storage vessel adjacent its opening to the upper end of the riser.

3. An elevated tank comprising a single supporting riser, a storage vessel located at the upper end of and supported solely by the riser, said vessel having a generally toroidal construction provided with an inclined elongated vertical cross-section having its upper and lower points of horizontal tangency horizontally displaced, and means connecting the storage vessel to the upper end of said riser.

4. An elevated tank comprising a single substantially cylindrical riser, a storage vessel located at the upper end of and supported solely by the riser, said vessel having a generally toroidal construction provided with an inclined elongated vertical cross-section that provides a positive vertical component of the tensional forces of the vessel at points of intersection of every vertical plane intersecting the cross-section, and means connecting the storage vessel to the upper end of said riser.

5. An elevated tank comprising a single substantially cylindrical riser, a storage vessel located at the upper end of and supported solely by the riser, said vessel having a generally toroidal construction provided with a generally oval vertical cross-section having its major axis inclined upwardly relative to the axis of the riser, the generally oval cross-section providing at least one positive vertical component of the tensional forces of the vessel at points on the cross-section lying in any vertical plane intersecting the cross-section, and means connecting the storage vessel to the upper end of said riser.

6. An elevated tank comprising a single substantially cylindrical riser, a storage vessel located at the upper end of and supported solely by the riser, said vessel having a generally toroidal construction provided with a generally elongated vertical cross-section having its major axis inclined upwardly relative to the axis of the riser, the generally elongated cross-section being formed so that its points of horizontal tangency are horizontally displaced and at least one positive vertical component of the tensional forces of the vessel exist at those portions which are vertically aligned in the cross-section of the vessel, and means connecting the storage vessel to the upper end of said riser.

7. An elevated tank comprising a single substantially cylindrical riser, a storage vessel located at the upper end of and supported solely by the riser, said vessel having a generally toroidal construction provided with an inclined elongated vertical cross-section having its upper and lower points of horizontal tangency horizontally displaced, internal supporting means interconnecting upper portions of the storage vessel, and means connecting the storage vessel to the upper end of said riser.

8. An elevated tank comprising a single substantially cylindrical riser, a storage vessel located at the upper end of and supported solely by the riser, said vessel having a generally toroidal construction provided with a generally oval vertical cross-section having its major axis inclined upwardly relative to the axis of the riser, the generally oval cross-section providing at least one positive vertical component of the tensional forces of the vessel at points on the cross-section lying in any vertical plane intersecting the cross-section, internal supporting means interconnecting the upper portions of the riser and the inwardly directed side of the storage vessel, and means connecting the storage vessel to the upper end of said riser.

9. An elevated tank comprising a single substantially cylindrical riser, a storage vessel located at the upper end of and supported solely by the riser, said vessel having a generally toroidal construction provided with an inclined elongated vertical cross-section having its upper and lower points of horizontal tangency horizontally displaced, external supporting means interconnecting lower portions of the storage vessel and the riser, and means connecting the storage vessel to the upper end of said riser.

10. An elevated tank comprising a single substantially cylindrical riser, a storage vessel located at the upper end of and supported solely by the riser, said vessel having a generally toroidal construction provided with an inclined oval elongated vertical cross-section having its upper and lower points of horizontal tangency horizontally displaced, external supporting means interconnecting lower portions of the storage vessel and the riser, and means connecting the storage vessel to the upper end of said riser.

11. An elevated tank comprising a single riser construction, a storage vessel for housing liquid supported solely by the riser construction, said vessel having a liquid storage structure suitably connected to, located outwardly of, and surrounding the riser construction, said structure provided with a non-circular vertical cross-section so that in every vertical plane intersecting the cross-section there exists a positive vertical component of the tensional forces of the vessel, and means for connecting the storage vessel to the riser construction.

12. An elevated tank comprising a single riser construction, a storage vessel for housing liquid supported solely by the riser construction, said vessel being constructed to extend around and to be attached to the riser construction and, further, having a non-circular curvilinear vertical cross-section having upper and lower points of horizontal tangency horizontally displaced, and means for connecting the storage vessel to the riser construction.

13. An elevated tank comprising a single riser construction, a storage vessel for housing liquid supported solely by the riser construction, said vessel surrounding the riser construction and having horizontally displaced inner and outer generally vertical surfaces which are interconnected by at least one generally horizontal surface, said inner vertical surface being connected to said riser construction, said vessel having a non-circular curvilinear vertical cross-section having upper and lower points of horizontal tangency horizontally displaced, and means for connecting the storage vessel to the riser construction.

No references cited.